US010625429B2

(12) United States Patent
Dunkmann et al.

(10) Patent No.: US 10,625,429 B2
(45) Date of Patent: Apr. 21, 2020

(54) VACUUM HANDLING APPARATUS

(71) Applicant: J. Schmalz GmbH, Glatten (DE)

(72) Inventors: Walter Dunkmann, Baden-Baden (DE); Walter Schaaf, Freudenstadt-Gruental (DE); David Straub, Rottenburg (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 16/391,532

(22) Filed: Apr. 23, 2019

(65) Prior Publication Data

US 2019/0337163 A1 Nov. 7, 2019

(30) Foreign Application Priority Data

May 4, 2018 (DE) .................. 10 2018 110 741

(51) Int. Cl.
*B25J 15/06* (2006.01)
*B25J 19/02* (2006.01)

(52) U.S. Cl.
CPC ........... *B25J 15/0616* (2013.01); *B25J 19/02* (2013.01)

(58) Field of Classification Search
CPC .............................. B25J 15/0616; B25J 19/02
USPC ........................................ 294/183, 185, 188
See application file for complete search history.

(56) References Cited

U.S. PATENT DOCUMENTS

| 4,858,976 | A  | * | 8/1989  | Stoll ..................... B25B 11/005 294/186 |
| 7,878,564 | B2 | * | 2/2011  | Kang .................. H01L 21/6838 294/186 |
| 9,833,909 | B2 | * | 12/2017 | Vaughn ................ B25J 15/0625 |
| 10,040,205 | B2 | * | 8/2018  | Yamamuro .............. B25J 15/06 |
| 10,059,009 | B1 | * | 8/2018  | Bronowski ......... G07F 17/0071 |
| 10,065,328 | B2 | * | 9/2018  | Takeuchi ............. B25J 15/0061 |
| 10,103,049 | B2 | * | 10/2018 | Bogner ............... B25J 15/0014 |

(Continued)

FOREIGN PATENT DOCUMENTS

| DE | 10 2014 218 295 A1 | 4/2015 |
| DE | 20 2016 101454 U1 | 6/2017 |

(Continued)

OTHER PUBLICATIONS

Non-translated Office Communication dated Sep. 17, 2019, pp. 1-7.

(Continued)

*Primary Examiner* — Paul T Chin
(74) *Attorney, Agent, or Firm* — Bond Schoeneck & King, PLLC; George McGuire

(57) ABSTRACT

A method for operating a vacuum handling apparatus, in particular for a human-machine-collaboration system, a vacuum gripper can be connected to a primary vacuum system to generate a vacuum, the method includes the following steps applying the vacuum gripper to a workpiece and building up a vacuum in the vacuum gripper by means of the primary vacuum system; holding the workpiece during its handling by means of the vacuum prevailing in the vacuum gripper, and monitoring at least one state variable during the handling; and generating an auxiliary vacuum in the vacuum gripper by a self-sufficient, secondary auxiliary vacuum system if the monitored state variable deviates from a target state.

15 Claims, 5 Drawing Sheets

(56) References Cited

U.S. PATENT DOCUMENTS

| | | | |
|---|---|---|---|
| 10,399,237 B2* | 9/2019 | Wigren | B25J 15/0625 |
| 10,408,670 B2* | 9/2019 | Holcomb | B25J 19/02 |
| 2012/0193500 A1* | 8/2012 | Kniss | B25B 11/007 |
| | | | 248/363 |
| 2014/0225391 A1* | 8/2014 | Kuolt | B25J 15/0616 |
| | | | 294/183 |
| 2017/0341880 A1 | 11/2017 | Strobel | |
| 2018/0369996 A1* | 12/2018 | Meyer | B25B 11/005 |

FOREIGN PATENT DOCUMENTS

| | | |
|---|---|---|
| DE | 202016101454 U1 | 6/2017 |
| WO | 2010038315 A1 | 4/2010 |
| WO | 2017157482 A1 | 9/2017 |
| WO | 2017157482 A1 | 9/2019 |

OTHER PUBLICATIONS

Non-translated German Office Action for German Applcation 10 2018 1110 741.2, filed May 4, 2018, pp. 1-6, dated Feb. 11, 2019.

* cited by examiner a)

b)

c)

VACUUM HANDLING APPARATUS

CROSS REFERENCE TO RELATED APPLICATIONS

The present application relates and claims priority to German patent application No. 10 2018 110 741.2 filed on May 4, 2018, the entire contents of which are incorporated herein by reference.

The invention relates to a method for operating a vacuum handling apparatus, in particular a vacuum handling apparatus for a human-machine-collaboration system. The invention further relates to a vacuum handling apparatus and to a human-machine collaboration system.

Vacuum handling apparatuses are known from the prior art in numerous designs and configurations. They can be arranged, for handling workpieces, on a handling device such as a robot.

To enable use of such vacuum handling apparatuses in the industry in working areas where personnel are present, it is necessary to comply with safety regulations. For example, the regulations DIN EN ISO 10218 and/or ISO/TS 15066 are applicable to this situation. Strict safety regulations are especially in force where—as provided for in the concept of human-machine collaboration (HMC), and especially human-robot collaboration (HRC)—humans and machines, and/or humans and robots, work cooperatively together in a working area in which there are no safety devices—for example, a safety fence to separate the operator of the machine and/or the robot.

In the case of the HMC and/or HRC, a falling workpiece can, due to the absence of a safety device, directly strike the operator and injure him as a result.

The practice is known of providing clamping devices as protection against a workpiece falling in the event of failure of the primary energy source used to generate the suction in the vacuum gripper of the vacuum handling apparatus. These are pressurized with compressed air during operation. As a result, a spring is biased, and the spring resets in the event of failure of the primary energy source. In this way, the clamping device closes in such a manner that the gripped workpiece is secured by a positive connection. Providing a clamping device designed in this manner is expensive, complex, and error-prone.

The invention has for its object to provide a reliably operable vacuum handling apparatus, in particular for use in human-machine collaboration, and more specifically in human-robot collaboration, which is comparably inexpensive, can be produced easily and/or compactly, and can be flexibly adapted.

This object is achieved by a method having the features of claim 1. Accordingly, a vacuum handling apparatus is provided which comprises a vacuum gripper fed by a primary vacuum system to generate a vacuum used for operation.

In particular, the method is used for operating the vacuum handling apparatus in a human-machine collaboration system—and more particularly in a human-robot collaboration system. However, it could also be contemplated that the method for operating the vacuum handling apparatus is used in a fully automated operation.

The method comprises the following steps:

a) applying the vacuum gripper to a workpiece and building up a vacuum in the vacuum gripper by means of the primary vacuum system;

b) holding the workpiece during its handling by means of the vacuum prevailing in the vacuum gripper (in particular, by means of the vacuum supplied by the primary vacuum system); monitoring at least one state variable during the handling; and c) generating an auxiliary vacuum in the vacuum gripper by means of a particularly self-sufficient, secondary auxiliary vacuum system which can be operated independently of the primary vacuum system and/or acts independently of the same, if the monitored state variable deviates from a target state.

According to the invention, if the state variable deviates from a target state, a safety vacuum can be provided over a certain period of time to maintain the vacuum required for the handling. This particularly makes it possible to continue the handling until a safe and/or defined final state is reached.

In principle, various measurable variables which are influenced by the operating state of the vacuum handling apparatus and/or are varied to influence the operating state (for example, a vacuum prevailing in the vacuum gripper, a volume flow of pressurized fluid, etc.) can be contemplated as the state variable, as will be explained further below. The state variable is particularly continuously detected and without interruption. However, it is also conceivable that the state variable is detected in an intermittent or clocked manner.

Providing the secondary, auxiliary vacuum system produces redundancy for the vacuum generation and/or vacuum system. As a result, the vacuum handling apparatus can be used in a particularly advantageous manner in an HMC and/or HRC system. In this case, the vacuum handling apparatus can interact directly with an operator without the operator being separated from the vacuum handling apparatus by a protective device, such as a safety fence.

Because the auxiliary vacuum system can independently furnish an auxiliary vacuum, the auxiliary vacuum system can be operated completely independently of an external power supply. As such, the vacuum handling apparatus can also be safely operated and/or transitioned to a safe state should all power systems in the vicinity of the apparatus fail. This can particularly prevent a situation in which an operator is injured by a falling workpiece in the event of a failure of the external power supply.

The vacuum handling apparatus can comprise the primary vacuum system. However, it can particularly be contemplated that the primary vacuum system is not a part of the vacuum handling apparatus, but rather builds up a vacuum and supplies the vacuum handling apparatus with the vacuum.

It can also be contemplated, of course, that several vacuum grippers are included. Each of these vacuum grippers can be assigned its own primary vacuum system, or there can be a central primary vacuum system for all vacuum grippers. If a plurality of vacuum grippers is present, then each vacuum gripper can either be assigned its own secondary, auxiliary vacuum system, or a central secondary, auxiliary vacuum system can be provided for all vacuum grippers.

In an advantageous development of the invention, in step b) the primary operating power used to operate the primary vacuum system is monitored as a state variable, and step c) is particularly carried out in the event of a detected failure of the primary operating power.

In this case, the electrical operating current and/or the electrical operating voltage can be monitored. If the primary operating power fails, the vacuum in the vacuum gripper can be maintained by the secondary, auxiliary vacuum system, in every event for a certain period of time—and the workpiece accordingly will not fall down, or at least not immediately, upon the failure of the primary operating power. This prevents, or at least reduces, the risk of injury to the operator interacting with the vacuum handling apparatus.

In a further advantageous embodiment of the invention, in step c) an action is additionally triggered. The action can include, for example, issuing a warning signal to an operator. This signal can be perceivable acoustically, visually and/or haptically. The signal can indicate to an operator that she should move away from the vacuum handling apparatus. On the other hand, the signal can indicate that the operator should manually control the vacuum handling apparatus by intervening to safely place the workpiece down.

Additionally or alternatively, the action may include interrupting the movement of the vacuum handling apparatus or moving the vacuum handling apparatus to a safe, final state. This measure can prevent injury to an operator in a particularly advantageous manner. The final state may particularly be at a position which cannot be reached by an operator.

It can also be contemplated that in step b) the pressure prevailing in the vacuum gripper is detected as a state variable, and step c) is carried out if the pressure in the vacuum gripper exceeds a threshold value. Additionally or alternatively, the pressure change can be detected in step b), such that step c) is carried out if the pressure change in the vacuum gripper exceeds a threshold value. As such, the method can also be employed in a particularly advantageous manner, by way of example, when a defect of the vacuum grippers arises—such as damage or wear—and therefore the vacuum provided by the primary vacuum system is not sufficient for safe handling.

Advantageously, a diagnostic cycle is carried out before step a), wherein the diagnostic cycle comprises the following steps:
ad) applying the vacuum gripper to a workpiece and building up a vacuum in the vacuum gripper by means of the primary vacuum system;
bd) detecting the pressure change in the vacuum gripper over time; and
cd) verifying whether the planned handling by means of the vacuum handling apparatus is safe to carry out.

The diagnostic cycle enables an additional safeguard for the vacuum handling apparatus. This allows verifying compliance with safety criteria before the planned handling of a workpiece. The verification can particularly determine whether the secure retention of the workpiece which will be handled is ensured in normal operation by the primary vacuum system. In addition or as an alternative, the verification can determine whether the auxiliary vacuum which can be provided by the secondary, auxiliary vacuum system is sufficient for the planned handling, to securely hold the workpiece in the event of a failure long enough that a risk of injury to the collaborating person is ruled out, or at least minimized.

In this context, it can be contemplated that parameters of the planned handling, such as travel distance and duration, are captured before the diagnostic cycle is carried out, in order to verify on the basis thereof whether safe handling is possible. This makes it possible to prevent, by way of example, the handling process from starting even though the handling apparatus is not configured to handle the specific workpiece. For example, the verification can determine whether a defect of the handling apparatus has arisen—in particular, due to wear.

Instead of applying a vacuum in step ad), applying an overpressure in the vacuum gripper and detecting the resulting pressure change can also be contemplated. Furthermore, it would also be conceivable to detect a volume flow in the vacuum gripper and/or a mass flow, and to verify on the basis thereof whether safe handling is possible.

It could also be contemplated that step bd) is not carried out only once the desired vacuum has been applied in step ad)—but rather that step bd) is already carried out during the build up of the vacuum in step ad).

Finally, it could also be contemplated that in step cd), the result means that safe handling is possible even without the secondary, auxiliary vacuum system, such that it is deactivated—in particular, to save energy.

Additionally or alternatively, a diagnostic cycle may be carried out prior to step a), comprising the following steps: detecting the workpiece which will be handled;
determining a stored target pressure change over time from a database, for carrying out steps ad) and bd) of the above method; and
verifying whether the planned handling by means of the vacuum handling apparatus can be carried out safely.

The determination of the workpiece which will be handled can be done by a manual input by the operator. In particular, material parameters, such as the type of material and/or its roughness and/or air permeability, can be input. Additionally or alternatively, a sensory detection of the workpiece which will be handled—for example, the sensory determination of the surface roughness—could also be contemplated. Of course, additionally or alternatively, it can be contemplated that system parameters are detected, such as parameters of the primary vacuum system and/or the secondary, auxiliary vacuum system; and/or process parameters, such as the planned acceleration and/or speed during the planned handling and/or the planned vacuum which will be applied to the workpiece for the handling.

Based on this, a target pressure change can be determined from a database. Consequently, the database can store the pressure changes which are to be expected over time for a system made of the vacuum handling apparatus and the workpiece which is suctioned to the same over time, when the vacuum gripper of the vacuum handling apparatus is applied to the workpiece and a vacuum is built up in the vacuum gripper (see steps ad) and bd) of the above method). Based on this, the verification can determine whether the planned handling process can be carried out safely at all. For example, the verification can determine whether the vacuum handling apparatus can securely hold the workpiece during the handling process, and whether a sufficient auxiliary vacuum can be provided by the auxiliary vacuum system in the event of a failure of the primary vacuum system.

It can be contemplated that, after determining the target pressure change from the database, the diagnostic method according to steps ab) to dd) is additionally carried out. In this case, the target pressure change over time is compared with the actual, measured pressure change. Based on this, the verification determines whether the planned handling can be safely carried out by means of the vacuum handling apparatus. As such, a verification is advantageously made to determine whether the expected target pressure change has actually occurred in the system. As a result, the safety of the vacuum handling apparatus can be further increased for use in an HMC and/or HRC environment.

One of the two aforementioned diagnostic cycles, or both diagnostic cycles, can be carried out before each separate handling process. However, it could particularly be contemplated that the diagnostic cycle or the diagnostic cycles are carried out only once before a series of similar handling operations.

It can also be contemplated that a test cycle is carried out prior to the diagnostic cycle, wherein the diagnostic cycle according to steps ad) to cd) is carried out to detect and store a target pressure change for at least one workpiece and/or a state of the vacuum handling apparatus.

This test cycle enables the detection of target pressure changes for different workpieces with different material properties—for example, different surface roughnesses. In addition, different states of the vacuum handling apparatus during the handling of a workpiece can be determined and stored in the database—wherein, in particular, different service life conditions can be detected.

It can be contemplated that the diagnostic cycle is carried out additionally or alternatively during the handling of the workpiece. It is therefore conceivable that a verification determines intermittently, during a handling process, whether the vacuum handling apparatus can safely transport the workpiece.

The object stated in the introduction is also achieved by a vacuum handling apparatus which is configured to carry out the method according to the invention, having a vacuum gripper and having a primary vacuum system for generating a vacuum for operating the vacuum gripper, wherein a secondary, auxiliary vacuum system is provided for the vacuum gripper, and wherein the auxiliary vacuum system is designed for self-sufficient generation and/or provision of an auxiliary vacuum in the vacuum gripper, independently of an external power supply. Consequently, even if the entire power supply in the environment of the vacuum handling apparatus fails, secure handling of the workpiece can be ensured because a self-sufficient, auxiliary vacuum can be applied in the vacuum gripper for the secure retention of the workpiece over a certain period of time. The primary vacuum system may be part of the vacuum handling apparatus. However, it can be particularly contemplated that the primary vacuum system is not a part thereof, and rather is connectable to the vacuum handling apparatus for generating and providing a working vacuum. Of course, the vacuum handling apparatus may also have a plurality of vacuum grippers. These can each have their own primary vacuum system and/or a secondary, auxiliary vacuum system. However, it would be conceivable, in particular, that only one central, primary vacuum system and/or one secondary, auxiliary vacuum system is/are provided.

In a particularly preferred embodiment of the invention, a control device is provided which is designed and configured for carrying out the method according to one of the preceding claims. In this case, the control device can comprise a sensor device for monitoring the state variable. The control device can therefore particularly comprise a pressure sensor for detecting the vacuum in the vacuum gripper. Additionally or alternatively, a current/voltage sensor can be present to determine if the primary power supply to the primary vacuum generator is ensured. In the case of pneumatic vacuum generation, providing a pressure sensor and/or a volume flow sensor in addition or as an alternative to a current/voltage sensor could also be contemplated.

It is particularly preferred that the vacuum handling apparatus comprises an auxiliary power device for the self-sufficient operation of the auxiliary vacuum system. This independently-provided secondary energy can be in the form of compressed air, or in particular in the form of electrical energy, by way of example. The electrical energy can be provided in an accumulator, a battery, a capacitor, or an uninterruptible power supply (UPS). A spring preload could also be contemplated.

The auxiliary vacuum system can particularly further comprise an auxiliary vacuum generator. This can be, for example, a pneumatic ejector, an electric pump, a vacuum accumulator, a vacuum accumulator with a pump, or a preloaded spring with a piston and a cylinder.

Advantageously, the vacuum gripper comprises a warning device. The warning device can particularly be designed to warn an operator if the secondary, auxiliary vacuum system is activated, and therefore if a deviation from normal operation of the vacuum system device occurs. If there are several vacuum grippers, one warning device can be provided for each vacuum gripper. In particular, however, a central warning device can be provided.

Preferably, the vacuum gripper comprises a suction body, wherein a protective element for protecting the suction body from damage is arranged on the vacuum gripper. The suction body particularly comprises a suction point for contact with a workpiece. The suction body can comprise, for example, a suction chamber for contact with a workpiece. Alternatively, it could also be contemplated that the suction body comprises a suction chamber with a suction wall, wherein the suction wall comprises one, or particularly a plurality of openings for the application of a vacuum to a workpiece. The protective element can be designed, for example, as a bell-shaped hood and can particularly provide mechanical protection against damage and/or wear for the suction body. In particular, the protective element can be constructed from solid material, by way of example as a turned part or a molded sheet metal part. Furthermore, it can also be contemplated that the protective element consists of a protective cover made of perforated metal sheet, or another material having holes, in order to preserve a view of the suction body.

In this case, the protective element must be arranged in such a manner that suction can still be securely applied to the workpiece. In this context, there is a distance between the protective element and the workpiece when the same is in the suctioned state. On the other hand, it can also be contemplated that the protective element is elastically resilient or is arranged to be displaceable along the vacuum gripper in order to provide flexibility for arranging a workpiece. In particular, in the diagnostic cycle, to determine whether a handling process can be carried out safely, it is assumed that no change to the vacuum handling apparatus occurs—for example, due to damage over time. In particular, if the diagnostic cycle is carried out only once prior to a series of handling operations, a trend extrapolation can be carried out, by way of example, to verify whether the auxiliary vacuum which can be provided by the auxiliary vacuum system is sufficient to ensure safe handling throughout the entire planned duration of the handling cycle. In this case, it is assumed that the mechanical boundary conditions remain the same, which can be ensured in particular by the provision of a protective element on the vacuum gripper.

Finally, the object stated at the outset is also achieved by a human-machine collaboration system, and in particular a human-robot collaboration system, comprising a vacuum handling apparatus according to the invention, and an operator who works together with the vacuum handling apparatus. In particular, such an HMC and/or HRC system can be designed without protective devices, and in particular without separating walls, such that an operator interacts directly with the vacuum handling apparatus. The vacuum handling apparatus can particularly be arranged as an end effector on a robot. Furthermore, the system can particularly be designed to comply with relevant standards, such as DIN EN ISO 10218 and/or ISO/TS 15066.

Further details and advantageous embodiments of the invention will become apparent from the following description, on the basis of which the embodiments of the invention shown in the figures are described and explained in more detail, wherein.

Figure 1:
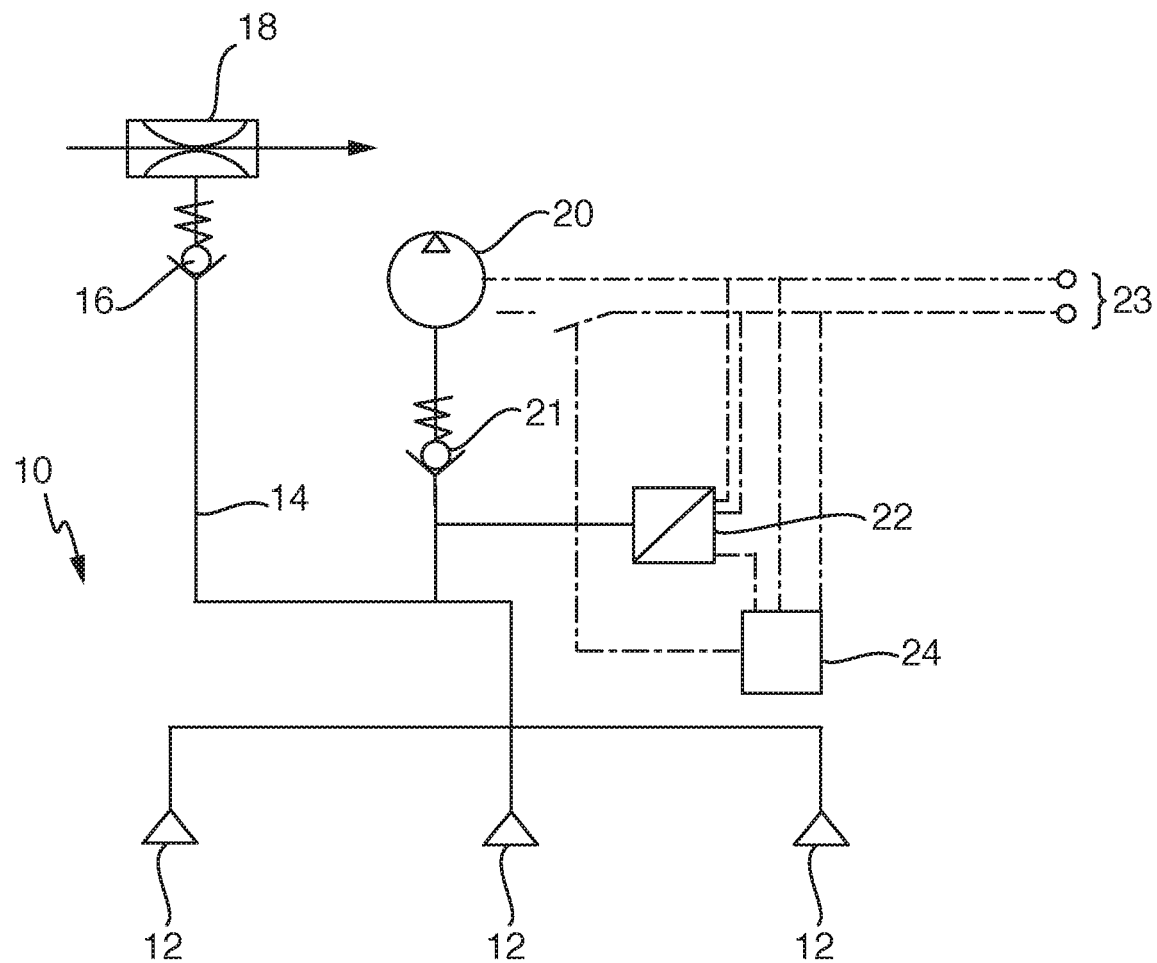
FIG. 1 shows a schematic representation of a vacuum handling apparatus according to a first embodiment.

FIG. 1 shows a vacuum handling apparatus 10 which is indicated as a whole with the reference numeral 10, having a plurality of vacuum grippers 12. The vacuum grippers 12 are connected via a shared fluid line 14 and via a check valve 16 to a primary vacuum system 18. In particular, the primary vacuum system 18 is not part of the vacuum handling apparatus 10. The primary vacuum system 18 is particularly driven by an external power source. The vacuum system 18 can be operated, for example, according to the Venturi principle. A secondary, auxiliary vacuum system 20 in the form of a vacuum pump is connected via a check valve 21 to the shared fluid line 14. In addition, the vacuum handling apparatus 10 comprises a control device 24 and an auxiliary power device 23—in particular, a voltage source—for example in the form of an accumulator which has stored electrical energy. Overall, the auxiliary vacuum system 20 is designed to be completely self-sufficient together with the auxiliary power device 23, and can be operated independently of an external power supply. In particular, in the event of a failure of the external operating power supply for the primary vacuum system 18, the auxiliary vacuum system 20 can be activated.

The vacuum system apparatus 10 is particularly designed for human-machine collaboration. In particular, the vacuum handling apparatus 10 can be formed on a robot, such that a human-robot collaboration system is formed. In this case, an operator can interact directly with the vacuum handling apparatus 10—and in particular, without separating protective devices, such as a partition.

The operation of the vacuum handling apparatus 10 is then as follows:

In order to handle a workpiece, which is not shown, the vacuum grippers 12 are placed on the workpiece. Then, by means of the primary vacuum system 18, a vacuum is built up in the vacuum grippers 12, such that the workpiece is held by suction. Subsequently, the workpiece can be handled—in particular, transported—the workpiece being held securely by the vacuum grippers 12.

During the handling process, the control device 24 monitors whether the primary vacuum system 18 is operating at primary operating power, so that a vacuum in the vacuum grippers 12 is ensured. If the primary operating power fails, and there is thus a danger that the vacuum in the vacuum grippers 12 will drop, and thus the workpiece will fall on the operator and injure him, the control device 24 activates the auxiliary energy device 23, such that the vacuum pump 20 is put into operation and thus an auxiliary vacuum is built up in the vacuum grippers 12 via the secondary, auxiliary vacuum system 20. In this way, a sufficient vacuum for holding the workpiece in the vacuum grippers 12 is ensured over a certain period of time. If the control device 24 detects a failure of the primary vacuum system 18, the control device 24 can also actuate a warning device, which is not shown, such that the operator is warned—for example, via an optical and/or acoustic signal. Additionally or alternatively, the control device 24 can also include at least one pressure sensor 22. A pressure sensor 22 can be provided additionally or alternatively to the arrangement shown, below the check valve 21, in one or all vacuum grippers 12. Then, if the pressure and/or the pressure change rate in one or all of the vacuum grippers 12 suddenly rises and the pressure and/or pressure change rate exceeds a threshold value, the auxiliary vacuum system 20 can be activated.

Furthermore, the control device 24 can be configured in such a manner that, upon activation of the auxiliary vacuum system 20, a movement of the vacuum handling apparatus 10 into a secured end position—for example, to a position remote from a possible position of the operator—is also carried out. As such, if the generated, auxiliary vacuum will no longer be sufficient, the workpiece can fall off of the vacuum grippers 12 without harming the operator.

Figure 2:
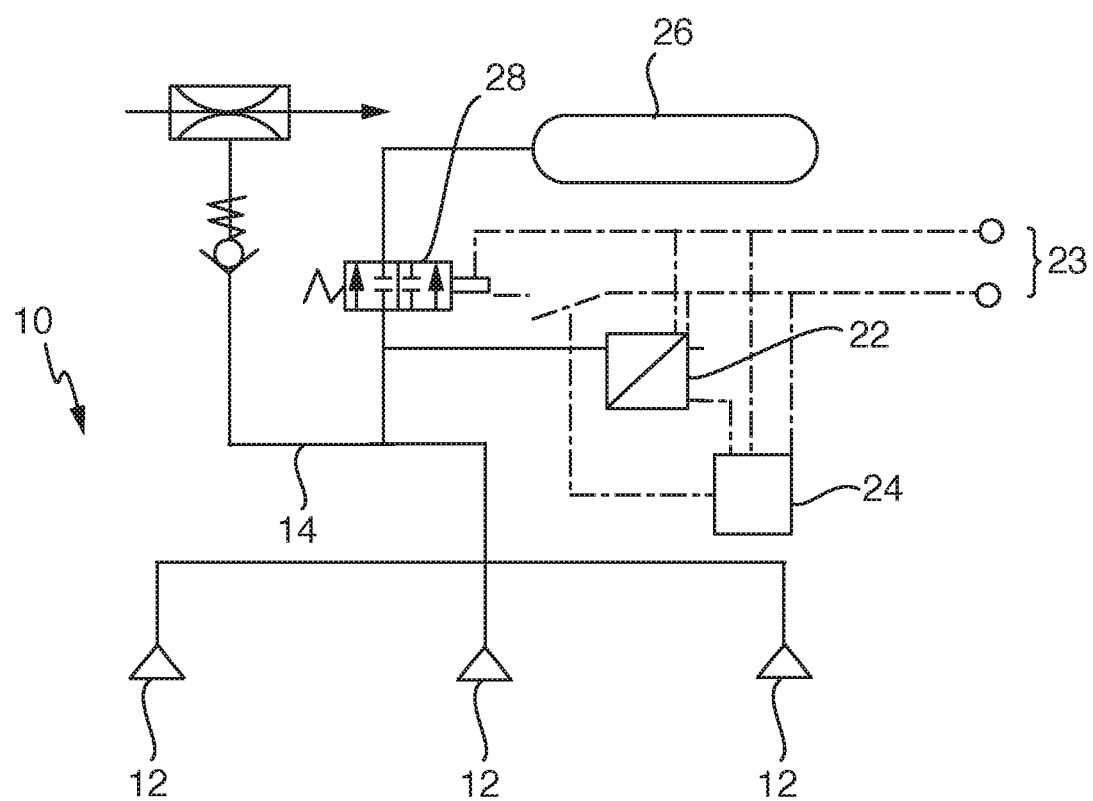
FIG. 2 shows a schematic representation of a vacuum handling apparatus according to a second embodiment.

In contrast to FIG. 1, FIG. 2 does not include an electrically operable pump 20, but rather a vacuum accumulator 26 which is connected to the shared fluid line 14 via a control valve 28. In this case, if necessary, the control valve 28 can be actuated by the control device 24, using the auxiliary power device 23, in such a manner that the control valve 28 opens, and a fluid connection between the shared fluid line 14 and the vacuum reservoir 26 is established as a result. As such, an auxiliary vacuum can be introduced into the vacuum gripper 12 to maintain a sufficient vacuum over a certain period of time.

Before a handling process is started, the control device 24 can carry out a diagnostic cycle which is described in greater detail below with reference to FIGS. 3 and 4:

An operator can start the diagnostic cycle in step 30. This start takes place before a planned workpiece handling process is carried out. Alternatively, the diagnostic cycle can also be started automatically by the control device 24.

Then, in step 32, the workpiece which will be handled is detected. This can be done either by a manual input by the operator, or the workpiece can be detected by sensors. For this purpose, the vacuum handling apparatus can have a sensor device, which is not shown. In this case, various parameters of the workpiece—such as its surface roughness and/or its air permeability and/or its weight—can be detected.

Based on this, a theoretically and/or experimentally determined target pressure change over time can be recalled in step 34 from a database, which can be activated by the control device 24. The target pressure change signifies the profile of the vacuum when a vacuum is applied to the workpiece in the vacuum grippers 12 and then the leakage is evaluated. This pressure profile can, for example, look as shown in FIG. 4. Consequently, the database stores a theoretically calculated and/or experimentally determined target pressure change profile for one or more parameters of the workpiece—for example, its air permeability and/or surface roughness—in interaction with the vacuum handling apparatus 10 which is used.

Then, this target pressure change profile can be verified in step 36. For this purpose, the vacuum grippers 12 are applied to the workpiece and a vacuum is built up by means of the primary vacuum system 18 in the vacuum grippers 12, and the workpiece is suctioned to the same. Subsequently, the pressure profile in the vacuum grippers 12 is determined by means of a sensor device, and transmitted to the control device 24. If the pressure drop over time is outside of the critical area 38 shown in FIG. 4, then the handling process is permitted in step 42 of FIG. 3. As such, the workpiece can be handled in step 44.

However, if it is determined in step 40 that the pressure change is in the critical region 38, then step 46 is carried out, and no permission is given for the handling process. It follows that the handling process is aborted in step 48. In this case, if the critical area 38 is reached, this means that the planned handling using the primary vacuum system cannot be carried out safely—that is, that it would not be possible to build up sufficient vacuum for safe handling of the workpiece. In addition, this can also mean that, although the primary vacuum which is generated would suffice for safe handling, the secondary vacuum system 20 could not provide sufficient vacuum, in the event of failure of the primary vacuum system 18, to ensure safe handling of the workpiece in the event of a primary energy failure.

Figure 3:
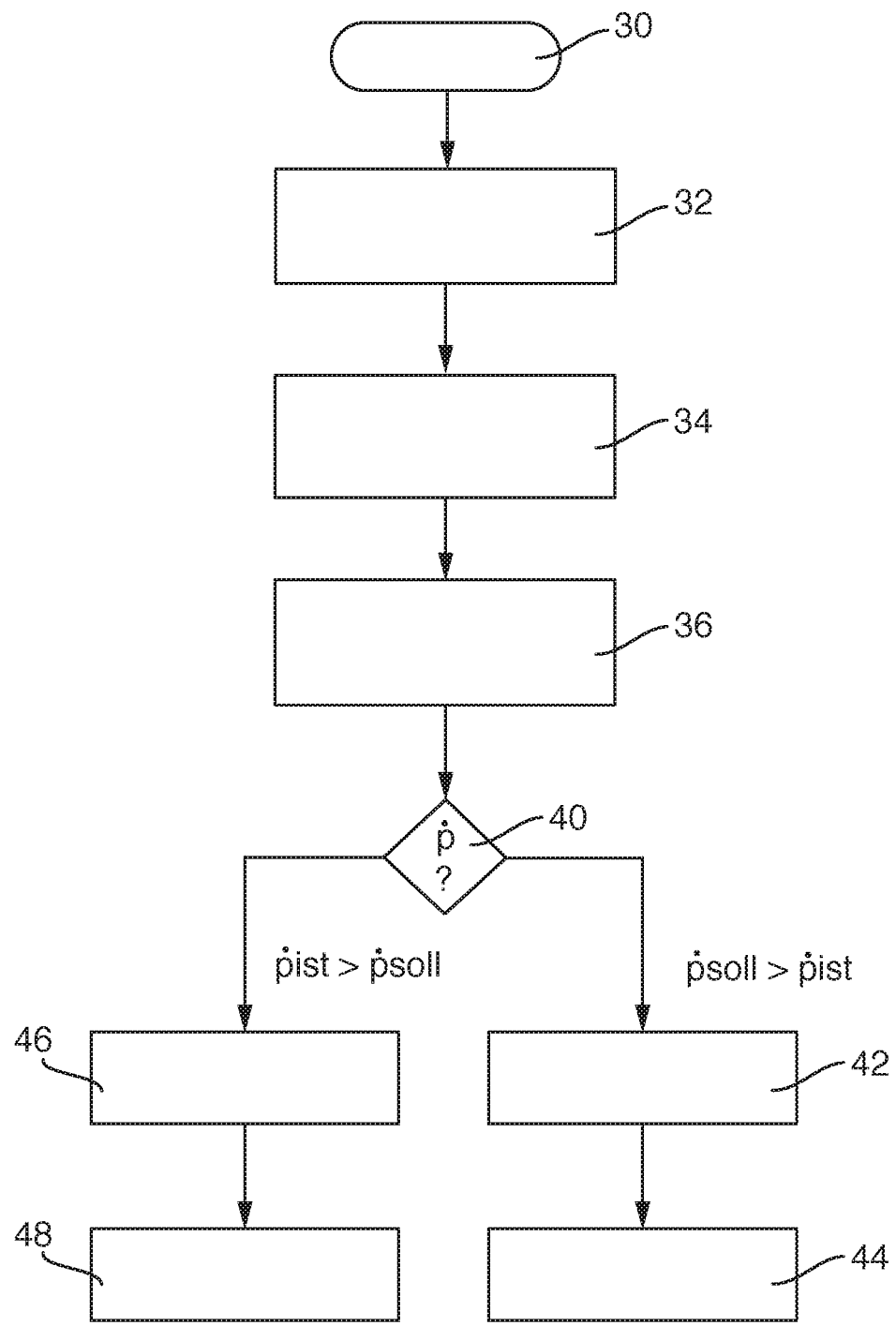
FIG. 3 shows a flowchart of a diagnostic cycle method before the handling of a workpiece by means of a vacuum handling apparatus according to FIG. 1 or 2.
Figure 4:
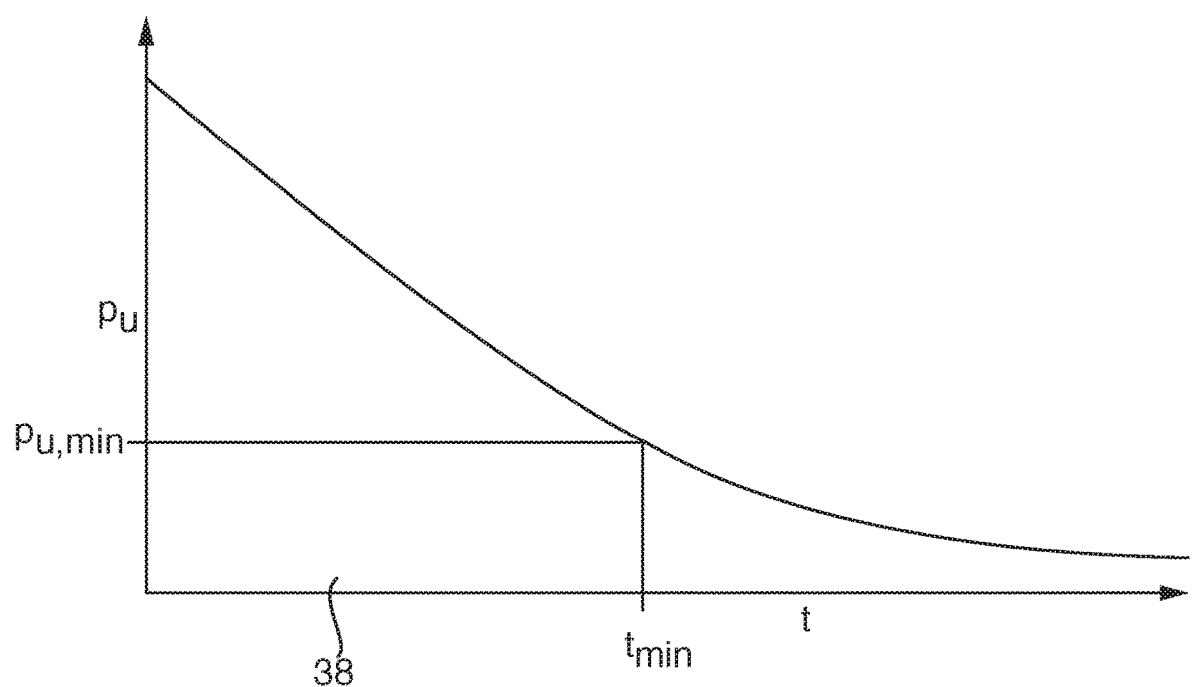
FIG. 4 shows an exemplary representation of a pressure-vs-time diagram obtained from carrying out the method according to FIG. 3.

The diagnostic cycle according to FIGS. 3 and 4 can be carried out for each separate handling of a workpiece. However, it can particularly be contemplated that a series of similar handling processes is carried out with similar workpieces, and the diagnostic cycle is only carried out once before the serial sequence of handling processes.

Figure 5:
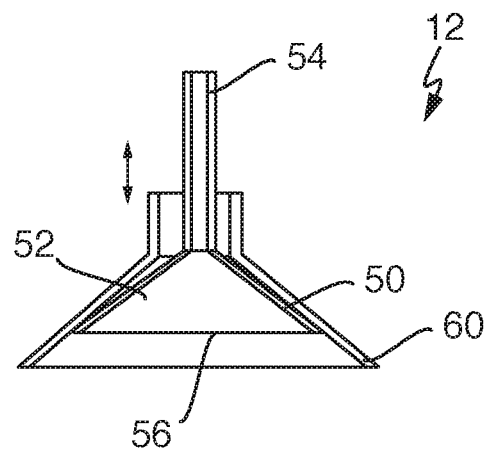
FIG. 5 shows a schematic representation of a vacuum gripper for a vacuum handling system according to FIG. 1 or FIG. 2, according to a first embodiment, in a first position (a) and a second position (b), and according to a second embodiment (c).
Figure 5:
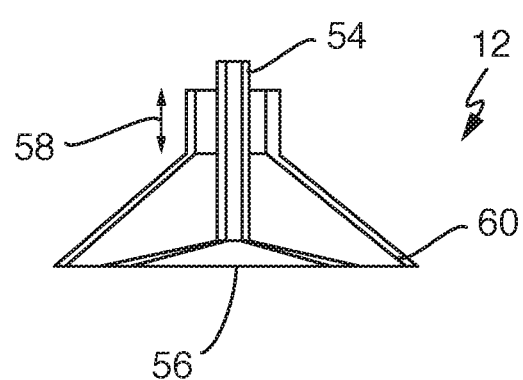
Figure 5:
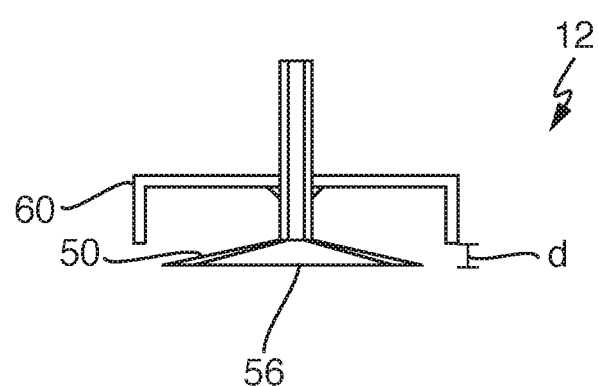

FIG. 5 shows two possible embodiments of vacuum grippers 12. The vacuum gripper 12 according to FIGS. 5*a* to 5*c* comprises a suction body 50 which delimits a suction chamber 52, which can be placed under vacuum via a cylindrical extension 54. In addition, the suction body 50 comprises a suction wall 56 with holes, which are not shown, wherein a workpiece can come into contact with the suction wall 56 for the handling operation.

In the embodiment according to FIGS. 5*a* and 5*b*, a protective element 60 which can be moved in the longitudinal direction 58 of the extension 54 is arranged on the extension 54. This protective element 60 is designed as a bell-shaped hood. The protective hood 60 can be designed to be elastically resilient, in particular to form a soft contact surface.

In the embodiment according to FIG. 5*c*, the protective element 60 is fixed to the extension 54 and is at a distance d from the suction wall 56 of the suction body 50, such that the workpiece cannot be damaged by the protective element 60, and the suction body 50 can still be protected against damage. In this case, the protective hood can be produced from a turned part or a formed sheet metal part, which can particularly have holes for visual inspection. Overall, the protective element 60 serves to reduce the risk of damage, particularly to the suction body 50 of the vacuum gripper 12, thereby making it possible to reduce a potential change in the properties of the vacuum handling apparatus 10 over the duration of the handling process.

This can be particularly important with regard to the diagnostic cycle shown in FIGS. 3 and 4. Namely, if a verification in steps 40 to 46 determines whether a planned, serial handling process can be safely carried out, an extrapolation of the expected mechanical change of the vacuum handling apparatus 10 over the process duration can be performed. In particular, it is assumed in such a case that the mechanical boundary conditions do not change and/or change only in a defined manner over the duration of the process—that is, no holes are formed in lines, hoses or in the vacuum grippers 12, for example by tearing off hoses, or by the vacuum grippers 12 being slit by sharp-edged workpieces (such as burred sheet metal). Also, intentional damage due to sharp tools cannot be extrapolated. As such, the protective element 60 serves, in particular, to prevent mechanical boundary conditions from changing over time.

What is claimed is:

1. A method for the operation of a vacuum handling apparatus comprising a vacuum gripper connectable to a primary vacuum system to generate a vacuum, the method comprising the steps of:
   a. applying the vacuum gripper to a workpiece and building up a vacuum in the vacuum gripper by means of the primary vacuum system;
   b. holding the workpiece during its handling by means of the vacuum prevailing in the vacuum gripper, and monitoring at least one state variable during the handling; and
   c. generating an auxiliary vacuum in the vacuum gripper by means of a self-sufficient, secondary auxiliary vacuum system if the monitored state variable deviates from a target state.

2. The method according to claim 1, wherein in step b) the primary operating power used to operate the primary vacuum system is monitored as a state variable, and step c) is carried out in the event of a detected failure of the primary operating power.

3. The method according to claim 1, wherein in step c) an action is triggered in addition.

4. The method according to claim 3, wherein the action comprises issuing a warning signal, wherein the action comprises at least one of interrupting the movement of the vacuum handling apparatus and moving the vacuum handling apparatus to a safe, final state.

5. The method according to claim 1, wherein in step b) the pressure and/or the pressure change in the vacuum gripper is detected as a state variable, and wherein step c) is carried out if the pressure and/or the pressure change in the vacuum gripper exceeds a threshold value.

6. The method according to claim 1, wherein a diagnostic cycle is carried out before step a), and the diagnostic cycle comprises the steps of:
   a. applying the vacuum gripper to a workpiece and building up a vacuum in the vacuum gripper by means of the primary vacuum system;
   b. detecting the change in pressure in the vacuum gripper over time; and
   c. verifying whether the planned handling by means of the vacuum handling apparatus can be carried out safely.

7. The method according to claim 6, wherein the diagnostic cycle is carried out during the handling of the workpiece.

8. The method according to claim 1, wherein a diagnostic cycle is carried out before step a), and the diagnostic cycle comprises the steps of:
   a. detecting the workpiece which is to be handled;
   b. determining from a database a stored target pressure-change over time that is necessary for carrying out the steps of applying the vacuum gripper to a workpiece and building up a vacuum in the vacuum gripper by means of the primary vacuum system, and detecting the change in pressure in the vacuum gripper over time; and
   c. verifying whether the planned handling by means of the vacuum handling apparatus can be carried out safely.

9. The method according to claim 8, wherein after the determination of the target pressure-change from the database, a diagnostic cycle is carried out before step a), and the diagnostic cycle comprises the steps of:

a. applying the vacuum gripper to a workpiece and building up a vacuum in the vacuum gripper by means of the primary vacuum system;
b. detecting the change in pressure in the vacuum gripper over time; and
c. verifying whether the planned handling by means of the vacuum handling apparatus can be carried out safely,
d. wherein the target pressure change over time is compared to the actual, measured pressure change, and based on this, a verification is made as to whether the planned handling by means of the vacuum handling apparatus can be carried out safely.

10. The method according to claim 8, wherein a test cycle is carried out before the diagnostic cycle, and wherein the diagnostic cycle comprises the steps of:
   a. applying the vacuum gripper to a workpiece and building up a vacuum in the vacuum gripper by means of the primary vacuum system;
   b. detecting the change in pressure in the vacuum gripper over time; and
   c. verifying whether the planned handling by means of the vacuum handling apparatus can be carried out safely; and
   d. detecting and storing a target pressure change for at least one workpiece and/or a state of the vacuum handling apparatus.

11. A vacuum handling apparatus, comprising a vacuum gripper and a primary vacuum system for generating a vacuum for operating the vacuum gripper, wherein the vacuum gripper comprises a secondary, auxiliary vacuum system, and wherein the auxiliary vacuum system is designed for at least one of self-sufficient generation and provision of an auxiliary vacuum in the vacuum gripper independently of an external power supply, whereby the vacuum handling apparatus is adapted to:
   a. apply the vacuum gripper to a workpiece and build up a vacuum in the vacuum gripper by means of the primary vacuum system;
   b. hold the workpiece during its handling by means of the vacuum prevailing in the vacuum gripper, and monitor at least one state variable during the handling; and
   c. generate an auxiliary vacuum in the vacuum gripper by means of a self-sufficient, secondary auxiliary vacuum system if the monitored state variable deviates from a target state.

12. The vacuum handling apparatus according to claim 11, wherein a control device is provided which is designed and adapted to carry out the method according to any one of the preceding claims, and wherein the control device particularly comprises a sensor device for monitoring the state variable, and wherein an auxiliary power device is provided for self-sufficient operation of the auxiliary vacuum system.

13. The vacuum handling apparatus according to claim 11, wherein the vacuum gripper comprises a warning device.

14. The vacuum handling apparatus according to claim 11, wherein the vacuum gripper comprises a suction body, and wherein a protective element for protecting the suction body from damage is arranged on the vacuum gripper.

15. A human-machine collaboration system, comprising a vacuum handling apparatus comprising:
   a. a vacuum gripper and a primary vacuum system for generating a vacuum for operating the vacuum gripper, wherein the vacuum gripper comprises a secondary, auxiliary vacuum system, and wherein the auxiliary vacuum system is designed for at least one of self-sufficient generation and/or provision of an auxiliary vacuum in the vacuum gripper independently of an external power supply, whereby the vacuum handling apparatus is adapted to:
      i. apply the vacuum gripper to a workpiece and build up a vacuum in the vacuum gripper by means of the primary vacuum system;
      ii. hold the workpiece during its handling by means of the vacuum prevailing in the vacuum gripper, and monitor at least one state variable during the handling; and
      iii. generate an auxiliary vacuum in the vacuum gripper by means of a self-sufficient, secondary auxiliary vacuum system if the monitored state variable deviates from a target state; and
   b. and an operator who works together with the vacuum handling apparatus.

* * * * *